(12) United States Patent
Tang et al.

(10) Patent No.: US 12,038,950 B2
(45) Date of Patent: Jul. 16, 2024

(54) JURISDICTION CODE GENERATOR

(71) Applicant: SAP SE, Walldorf (DE)

(72) Inventors: Jiasheng Tang, Shanghai (CN); Yong Kang Guo, Shanghai (CN); Xiangyun Zhong, Shanghai (CN)

(73) Assignee: SAP SE, Walldorf (DE)

( * ) Notice: Subject to any disclaimer, the term of this patent is extended or adjusted under 35 U.S.C. 154(b) by 614 days.

(21) Appl. No.: 17/115,316

(22) Filed: Dec. 8, 2020

(65) Prior Publication Data

US 2022/0179886 A1 Jun. 9, 2022

(51) Int. Cl.
*G06F 16/00* (2019.01)
*G06F 16/29* (2019.01)
*G06F 40/205* (2020.01)

(52) U.S. Cl.
CPC ............ *G06F 16/29* (2019.01); *G06F 40/205* (2020.01)

(58) Field of Classification Search
CPC .............................. G06F 16/29; G06F 40/205
See application file for complete search history.

(56) References Cited

U.S. PATENT DOCUMENTS

| | | | |
|---|---|---|---|
| 9,264,857 B1* | 2/2016 | Rinckes | H04W 4/025 |
| 2009/0234573 A1* | 9/2009 | Notarantonio | G06Q 30/0283 |
| | | | 705/400 |
| 2013/0113993 A1* | 5/2013 | Dagit, III | G06F 3/04883 |
| | | | 348/734 |
| 2013/0262512 A1* | 10/2013 | Obayashi | G06F 16/22 |
| | | | 707/772 |
| 2014/0052799 A1* | 2/2014 | Keane | H04L 51/48 |
| | | | 709/206 |
| 2018/0129691 A1* | 5/2018 | Mathur | G06F 16/2272 |

FOREIGN PATENT DOCUMENTS

KR 20100022970 A * 3/2010

* cited by examiner

*Primary Examiner* — Tiffany P Young
(74) *Attorney, Agent, or Firm* — Buckley, Maschoff & Talwalkar LLC

(57) ABSTRACT

The present disclosure involves computer-implemented methods, software, and systems for determining a jurisdiction code for an address master data object instance. A computer-implemented method includes receiving an address information from a master data application, converting the received address information into geographic coordinates using a mapping service, generating a truncated geocode using the geographic coordinates, encoding the truncated geocode into a jurisdiction code using an encoding scheme, and storing the Jurisdiction code in a jurisdiction code field of the address master data.

16 Claims, 7 Drawing Sheets

JURISDICTION CODE GENERATOR

TECHNICAL FIELD

The present disclosure relates to computer-implemented methods, software, and systems for determining a jurisdiction code for the address of a master data object instance for a given usage in a business transaction document, master data object, or business process.

BACKGROUND

Many organizations may rely on enterprise software applications including, for example, enterprise resource planning (ERP) software, customer relationship management (CRM) software, and/or the like. These enterprise software applications may provide a variety of functionalities including, for example, invoicing, procurement, payroll, time and attendance management, recruiting and onboarding, learning and development, performance and compensation, workforce planning, production, logistics, procurement, and/or the like. Some enterprise software applications may be hosted by a cloud-computing platform such that the functionalities provided by the enterprise software applications may be accessed remotely by multiple end users. For example, an enterprise software application may be available as a cloud-based service including, for example, a software as a service (SaaS) and/or the like.

An enterprise software's capabilities span lines of business, from finance, supply chain, and manufacturing to sales, distribution, and more. Finance is an important module to perform financial operations and accounting in real time such as accounting and financial close, tax calculation, treasury and cash management, accounts payable and receivable, risk management, and more.

Sales and use tax in many countries is calculated at the local level. Which means that each state, county, and city can define their own sales and use tax rates. Typically, tax calculations are performed using Jurisdiction codes. A jurisdiction code is a key which (together with the tax code) determines the tax amount and the way in which payment of the total tax amount is divided between different tax authorities. Jurisdiction codes are used in some countries such as USA and Brazil. However, one of the key challenge in determining the right jurisdiction code is that Jurisdiction boundaries can be redrawn, tax rates can change at any level up or down the jurisdiction chain, and different kinds of products or transactions can be defined as taxable or tax exempt. With literally thousands of jurisdictions, any of which can change at any time, it's both difficult and important to keep up to date on these changes.

Businesses that are run in multiple locations may use an external tax partner for calculating sales and use tax and for determining tax jurisdiction code for a given address information. The jurisdiction information and jurisdiction codes are transferred during Master Data Address Maintenance, and the tax amounts and tax rates are retrieved during order and invoice processing out of finance, materials management, and sales and distribution.

In general, a tax partner would encode the address data such as the postal code, district name, and city name into a Jurisdiction code. However, in several instances, the tax calculations made using this Jurisdiction code are inaccurate because different tax laws and tax rates may apply to two addresses within the same street or locality. In order to avoid this problem, some tax partners require more detailed address information such as the street name and door number in order to more accurately perform the tax calculation. However, one of the key challenges with using this detailed address information is that many existing tax calculation solutions provide a field for storing the jurisdiction code whose length is fixed. The fixed character length may not be able to accommodate a code that represents the street name and door number as well.

SUMMARY

The present disclosure relates to computer-implemented methods, software, and systems for generating a jurisdiction code using an encoding scheme are described herein. In an aspect, the method of generating a jurisdiction code using an encoding scheme involves receiving, by a jurisdiction code determining service, an address information from a master data application. The received address information is converted into geographic coordinates using a mapping service. The geographic coordinates are then encoded into a Jurisdiction code and stored in the Jurisdiction code field of the address master data. In another aspect, the jurisdiction code determining service receives a Jurisdiction code from a client application. The Jurisdiction code is decoded to generate a truncated geocode that represents an address information. Further, the truncated geocode is decoded to extract geographic coordinates. The geographic coordinates are converted into an address information and sent to the client application for further processing.

These and other benefits and features of embodiments will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for generating a jurisdiction code using an encoding scheme by enterprise resource planning services are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments. As used in the present disclosure, the term "structured data" is intended to encompass data organized into an identifiable structure. Examples of structured data may include a database, a business object (BO), and other suitable structured data. As used in the present disclosure, the term "unstructured data" is intended to encompass information that does not have a predefined data model and/or identifiable structure. Examples of unstructured data may include bitmap images, text, emails, and documents. Examples of documents may include text files, word processing files, web pages, sales orders, invoices, and other suitable unstructured data.

Figure 1:
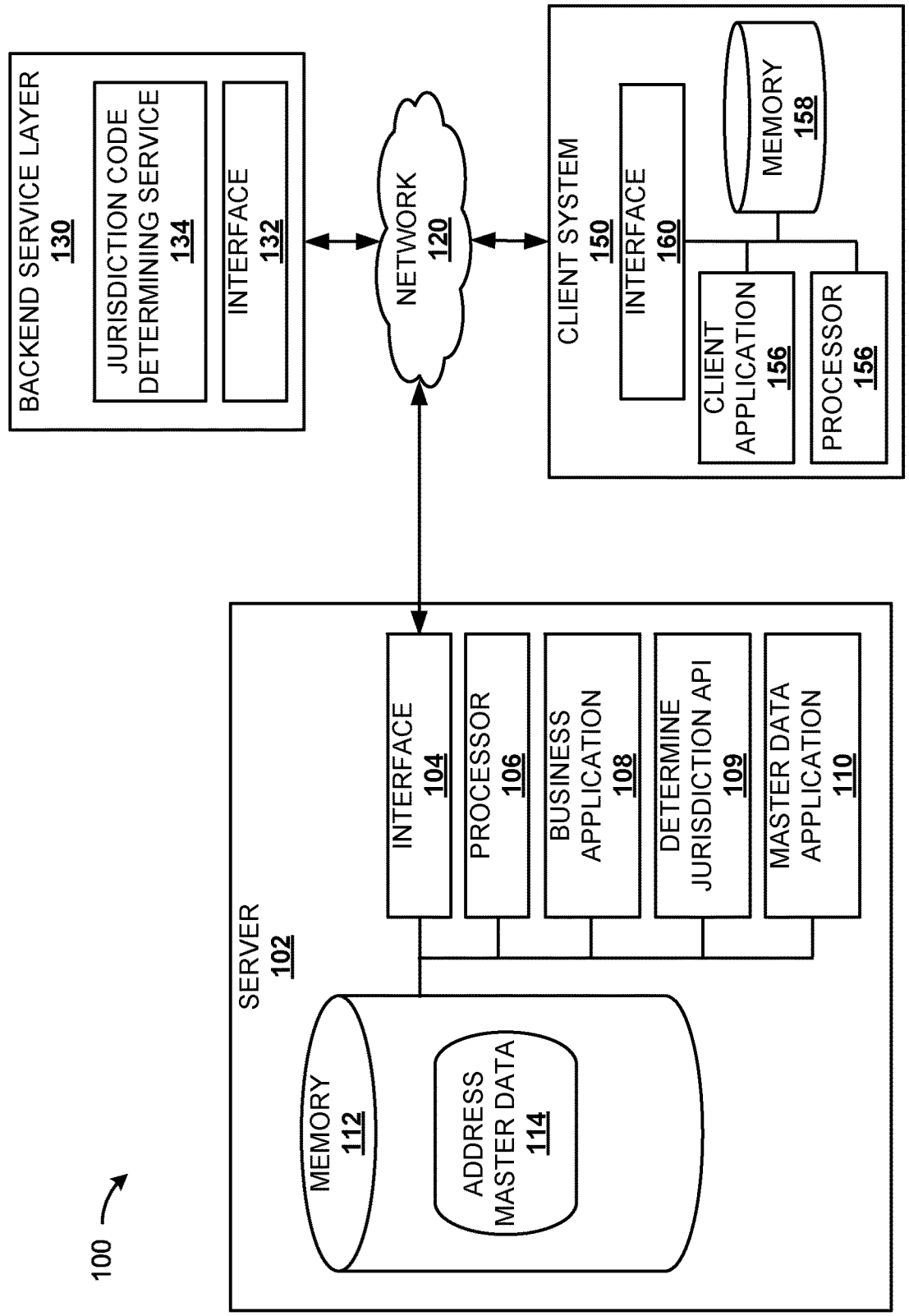
FIG. 1 illustrates an example system for determining a jurisdiction code for a master data address.

Turning to the figures, FIG. 1 illustrates an example environment 100 for supporting determination of Jurisdiction code for an address MDO instance stored in ERP system in accordance with one implementation of the present disclosure. As used in the present disclosure, the term "address" is intended to encompass a physical location (e.g., GPS coordinates), mailing address, Postal Box, or other suitable geographic location information.

The illustrated environment 100 includes, or is communicably coupled with, a server 102, a network 120, a backend service layer 130, and a client 150. Environment 100 may represent an ERP system integrating internal and external management information across an entire organization and enabling the flow of information between all business functions inside boundaries of the organization and manages connections to outside stakeholders to the organization. The server 102, the backend service layer 130, and the client 150 may communicate across or via network 120. In general, example environment 100 depicts an example configuration of a system for determining a jurisdiction code of an address MDO instance. In alternative implementations, the elements illustrated within the server 102, the backend service layer 130, and the client 150 may be included in or associated with different and/or additional servers, clients, networks, or locations other than those illustrated in FIG. 1. Additionally, the functionality associated with any component illustrated in example environment 100 may be associated with any suitable system, including by adding additional instructions, programs, applications, or other software to existing systems. For example, the components illustrated within the server 102 may be included in multiple servers, cloud-based networks, or other locations accessible, either directly or via network 120, to the server 102.

In general, the server 102 is any server that provides support for determining a Jurisdiction code for at least one address master data instance 114 via a Jurisdiction Code Determining service 134. Although illustrated as residing locally to server 102, the at least one Address Master Data 114 instance may reside either locally or remote to the server 102.

For example, each server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). In some implementations, other non-Java based servers and or systems could be used for the server 102. In some implementations, each server 102 can store and execute a plurality of various other applications (not illustrated), while in other implementations, each server 102 may be a dedicated server meant to store and execute a particular business application 108 and its related functionality. In some implementations, the server 102 can comprise a Web server or be communicably coupled with a Web server, where the particular business application 108 associated with that server 102 represents a Web-based (or Web-accessible) application accessed and executed on an associated client system 150 to perform the programmed tasks or operations of the corresponding business application 108. In still other instances, the business application 108 may be executed on a first system, while the business application 108 manipulates and/or provides information for data located at a remote, second system (not illustrated).

At a high level, the server 102 comprises an electronic computing device operable to receive, transmit, process, store, or manage data and information associated with the example environment 100. The server 102 illustrated in FIG. 1 can be responsible for receiving application requests from a client 150 (as well as any other entity or system interacting with the server 102), responding to the received requests by processing said requests in an associated business application 108 and sending the appropriate responses from the business application 108 back to the requesting client 150 or other requesting system. A business application is usually used to create business documents, where sales and use taxes must be considered. The business application 108 can also process and respond to local requests from a user locally accessing the associated server 102 or requests from a user of any client system like 150. Accordingly, in addition to requests from the external clients 150 illustrated in FIG. 1, requests associated with a particular business application 108 may also be sent from internal users, external or third-party customers, as well as any other appropriate entities, individuals, systems, or computers. In some implementations, the business application 108 can be a Web-based application executing functionality associated with the networked or cloud-based business process.

As used in the present disclosure, the term "computer" is intended to encompass any suitable processing device. For example, although FIG. 1 illustrates a single server 102, example environment 100 can be implemented using any number of servers, as well as computers other than servers, including a server pool. Indeed, the server 102 may be any computer or processing device such as, for example, a blade server, general-purpose personal computer (PC), Macintosh, workstation, UNIX-based workstation, tablet computer, or any other suitable device. In other words, the present disclosure contemplates computers other than general purpose computers, as well as computers without conventional operating systems. Further, the illustrated server 102 may be adapted to execute any physical or virtual operating system, including Linux, UNIX, Windows, Mac OS, WebOS, iOS, Android, or any other suitable operating system.

In the illustrated implementation of FIG. 1, the server 102 includes an interface 104, a processor 106, a business application 108, and a memory 112. While illustrated as a single component in the example environment 100 of FIG.

1, alternative implementations may illustrate the server 102 as comprising multiple or duplicate parts or portions accordingly.

The interface 104 is used by the server 102 to communicate with other systems in a client-server or other distributed environment (including within example environment 100) connected to the network 120 (e.g., an associated client 150, as well as other systems communicably coupled to the network 120). FIG. 1 depicts both a server-client environment but could also represent a cloud-computing network. Various other implementations of the illustrated example environment 100 can be provided to allow for increased flexibility in the underlying system, including multiple servers 102 performing or executing at least one additional or alternative implementation of the business application 108. In those implementations, the different servers 102 may communicate with each other via a cloud-based network or through the connections provided by network 120. Returning to the illustrated example environment 100, the interface 104 generally comprises logic encoded in software and/or hardware in a suitable combination and operable to communicate with the network 120. More specifically, the interface 104 may comprise software supporting at least one communication protocol associated with communications such that the network 120 or the interface's hardware is operable to communicate physical signals within and outside of the illustrated example environment 100.

Generally, the server 102 may be communicably coupled with a network 120 that facilitates wireless or wireline communications between the components of the example environment 100, that is the server 102, the backend service layer 130, and the client 150, as well as with any other local or remote computer, such as additional clients, servers, or other devices communicably coupled to network 120, including those not illustrated in FIG. 1. In the illustrated example environment 100, the network 120 is depicted as a single network, but may be comprised of more than one network without departing from the scope of this disclosure, so long as at least a portion of the network 120 may facilitate communications between senders and recipients. In some implementations, at least one component associated with the server 102 can be included within the network 120 as at least one cloud-based service or operation. The network 120 may be all or a portion of an enterprise or secured network, while in another implementation, at least a portion of the network 120 may represent a connection to the Internet. In some implementations, a portion of the network 120 can be a virtual private network (VPN). Further, all or a portion of the network 120 can comprise either a wireline or wireless link. Example wireless links may include cellular, 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated example environment 100. The network 120 may communicate, for example, Internet Protocol (IP) packets, Frame Relay frames, Asynchronous Transfer Mode (ATM) cells, voice, video, data, and other suitable information between network addresses. The network 120 may also include at least one local area network (LAN), radio access network (RAN), metropolitan area network (MAN), wide area network (WAN), all or a portion of the Internet, and/or any other communication system or systems in at least one location. The network 120, however, is not a required component in some implementations of the present disclosure.

As illustrated in FIG. 1, the server 102 includes a processor 106. Although illustrated as a single processor 106 in the server 102, two or more processors may be used in the server 102 according to particular needs, desires, or particular implementations of example environment 100. The processor 106 may be a central processing unit (CPU), a blade, an application specific integrated circuit (ASIC), a field-programmable gate array (FPGA), or another suitable component. Generally, the processor 106 executes instructions and manipulates data to perform the operations of the server 102 and, specifically, the functionality associated with the corresponding business application 108. In one implementation, the processor 106 executes the functionality required to also receive and respond to requests and instructions from the client 150.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, C#, Java, Visual Basic, assembler, Perl, any suitable version of a 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated example environment 100, each processor 106 executes the business application 108 stored on the associated server 102. In other implementations, a particular server 102 can be associated with the execution of two or more business applications 108 as well as at least one distributed application (not illustrated) executing across two or more servers 102.

At least one business application 108 is illustrated within the server 102. Although illustrated as a business application 108 in the server 102, two or more business applications 108 may be used in the server 102 according to particular needs, desires, or particular implementations of example environment 100. The business application 108 can be any application, program, module, process, or other software that may execute, change, delete, generate, or otherwise manage information associated with a particular server 102, and in some cases, a business process performing and executing business process-related events. In particular, business processes communicate with other users, applications, systems, and components to send and receive events. In some implementations, a particular business application 108 can operate in response to and in connection with at least one request received from an associated client 150. Additionally, a particular business application 108 may operate in response to and in connection with at least one request received from other business applications 108, including a business application 108 associated with another server 102. In some implementations, each business application 108 can represent a Web-based application accessed and executed by remote clients 150 via the network 120 (e.g., through the Internet, or via at least one cloud-based service associated with the business application 108). For example, a portion of a particular business application 108 may be a Web service associated with the business application 108 that is remotely called, while another portion of the business application 108 may be an interface object or agent bundled for processing at a remote client 150. Moreover, any or all of a particular business application 108 may be a child or sub-module of another software module or enterprise application (not illustrated) without departing from the scope of this disclosure. Still further, portions of the particular business application 108 may be executed or accessed by a user working directly at the server 102, as well as remotely at a corresponding client 150. In some implementations, the server 102 can execute the business application 108. In some implementations, the business application 108 can be executed via a client 150 accessing the business application 108.

The server 102 also includes a memory 112 for storing data and program instructions. The memory 112 may include any memory or database module and may take the form of volatile or non-volatile memory including, without limitation, magnetic media, optical media, random access memory (RAM), read-only memory (ROM), flash memory, removable media, or any other suitable local or remote memory component. The memory 112 may store various objects or data, including classes, frameworks, applications, backup data, business objects, jobs, Web pages, Web page templates, database tables, process contexts, repositories storing services local to the server 102, and any other appropriate information including any parameters, variables, database queries, algorithms, instructions, rules, constraints, or references thereto associated with the purposes of the server 102 and its business application 108. In some implementations, including a cloud-based system, some or all of the memory 112 can be stored remote from the server 102, and communicably coupled to the server 102 for usage. As illustrated in FIG. 1, memory 112 includes the at least one MDO 114 instance and condition records (not shown).

The at least one address MDO 114 instance may represent a business object (BO) defining core business entities used in applications across an organization. For example, traditional MDOs may describe customers, products, employees, vendors, parts, policies, activities, etc. Often, the core business entities described by master business objects are subjected to enterprise governance policies, along with their associated metadata, attributes, definitions, roles, connections and taxonomies. In some implementations, the at least one MDO 114 instance provides a low-level association from BO nodes, under which an address instance is stored, to an address snapshot 115 instance using a unique reference value. In an embodiment, the at least one MDO instance is an address instance maintained by an end user in a Master data application 110. The master data application 110 enables the system to edit and maintain master data for organizational units, customers, suppliers, plants, etc. When an address master data is stored in the Master data application 110, the address information is sent to a Determine Jurisdiction API 109. The Determine Jurisdiction API 109 is a programming interface, which receives a given address information as input (including state code, county name, city name, zip-code, street name, door number, etc.), and provides the so-called jurisdiction code which is relevant for tax calculation. The determine Jurisdiction API 109 calls the Jurisdiction code determining service 134 to which the detailed address information is sent in plain text. The detailed address information includes street name, door number, county name, city name and state name. The jurisdiction code determining service 134 uses a map service. A map service as used herein is any service that makes maps, features, and attribute data available inside many types of client applications. The Jurisdiction code determining service 134 uses the map service to translate the detailed address information into longitude and latitude coordinates. Further, the Jurisdiction code determining service 134 encodes the latitude and longitude coordinates into a jurisdiction code using an encoding scheme such as a Base36 encoding scheme. The jurisdiction code is then returned to the Master Data Application 110 which stores the geocode as a Jurisdiction code in the Jurisdiction code field of the Address Master Data 114.

The condition record may comprise rules, criteria conditions, parameters, variables, algorithms, instructions, constraints, references, queries, and any other appropriate information provided by a user to determine the taxability for an MDO instance. Condition records allow a user to store and retrieve taxability related data in the system. All the taxability elements of daily business—the prices, tax codes, country codes, shipping address, plant address—that you want to use for automatic tax calculation must be stored in the system as condition records. For example, if tax code is XX, and if country code is YY, then the tax rate should be ZZ. In another example, a Condition Record could have a rule such as, if the shipping departure country is XX, destination country is YY, and the customer classification code is ZZ, then taxes should be calculated via 3rd party application or service. For example, the condition record may have as condition parameters a party role, a location role, material role or a validity date or any other suitable condition as would be understood by one skilled in the art. A party role, for example, may include whether a party is to ship to/from, bill to/from, a manufacturer or reseller, or other suitable party role in a document instance. A location role, for example, may include where a broken machine is located that needs replacement parts, where a customer is located, or other suitable location role. A validity date may include data indicating that an address is only valid between two dates, after a specific date, before a specific date, or other suitable validity date. The condition record may be accessed, for example, via a Web service, a remote access system or software, a local or remote client 150, the business application 108, or other suitable system component.

In an embodiment, the Business Application 108 carries out a business transaction such as a supplier invoice generation or customer billing. Such transactions typically require the business user to input some line items which have an associated master data. For example, a transaction involving customer billing may have line items that have associated pick up or delivery address information relating to a manufacturing or supplier plant. The Business Application reads the master data relating to the customer such as the customer ID and customer address information. The customer address information is read from the Jurisdiction code field which contains a geocode of the address. The Business Application may then use the Geocode to process business transactions. In an example, the Business Application calls a Calculate taxes API and provides the geocode associated with the customer address. The Calculate taxes API may need additional address information such as the ship from plant information which it can read from the Address Master data using the identification information (ID) of the plant provided by the API. The taxes can then be calculated internally or through a third-party application. In an embodiment, the retrieved Geocodes of addresses such as ship to, ship from, Point of Order Origin (POO) and Point of Order Acceptance (POA) are sent to the third-party Application for tax calculation. Point of Order Origin refers to the address (or geographical point) where a sales order originated. In many cases, it's the address of the customer. Point of Order Acceptance is the address (or geographical point)

where a sales order is accepted. In many cases, it's the address of the supplier. The third-party application may in some instances, call the Jurisdiction code determining service to decode the Geocode. The Jurisdiction Code determining service may again use the Map service to decode the geocode into a detailed address information including a street name and door number and returns the detailed address information to the third-party Application. In an embodiment, the third-party application is an application associated with an external tax partner.

The SOA backend service layer 130 provides software services to example environment 100. The business functionality of the ERP system may be accessible for all service consumers via this service layer. The software services, such as illustrated Jurisdiction Code Determining service 134, provide reusable, defined business functionalities through a defined interface. For example, the interface, such as interface 132, may be software written in extensible markup language (XML) or other suitable language. While illustrated as a stand-alone component in the example environment 100 of FIG. 1, alternative implementations may illustrate the backend service layer 130 as integrated with other components of example environment 100. Moreover, any or all parts of the backend service layer 130 may be implemented as child or sub-modules of another software module or enterprise application (not illustrated) or of another hardware module (not illustrated) without departing from the scope of this disclosure.

The jurisdiction code determining service 134 provides the Jurisdiction code of an address associated with a particular MDO 114 instance using an encoding scheme. In some implementations the jurisdiction code determining service 134 can be a Web service. For example, the jurisdiction code determining service 134 can provide methods for business application 108 or other software component (not illustrated) to determine a jurisdiction code for an address MDO for a local/remote client 150 or other suitable hardware and/or software components (not illustrated) using the Internet and a Web browser application. While illustrated as a stand-alone component in the backend service layer 130, alternative implementations may illustrate the jurisdiction code determining service 134 as integrated with other components of example environment 100. Moreover, any or all parts of the jurisdiction code determining service 134 may be implemented as child or sub-modules of another software module or enterprise application (not illustrated) or of another hardware module (not illustrated) without departing from the scope of this disclosure.

In general, a client 150 is any computer device operable to connect or communicate with server 102 using a wireless or wireline connection (i.e., network 120). In particular, the client 150 may be embodied as a mobile or non-mobile computing device. At a high level, each client 150 can include a processor 154, a GUI (not shown in Figure), a client application 156, a memory 158, and an interface 160. In general, the client 150 comprises an electronic computer device operable to receive, transmit, process, and/or store any appropriate data associated with a server 102 or other suitable data source.

The GUI of the client 150 is operable to allow the user of the client 150 to interface with at least a portion of the system 100 for any suitable purpose, including to allow a user of the client 150 to interact with at least one client application 156 and business application 108. In particular, the GUI may provide users of the client 150 with a visualized representation of the client application 156, business application 108, and any other client 150 functionalities. The GUI may include a plurality of user interface elements such as interactive fields, pull-down lists, buttons, and other suitable user interface elements operable at the client 150.

In some implementations, processor 154 can be similar to processor 106 of the server 102. In other implementations, the processor 154 may be a processor designed specifically for use in client 150. Further, although illustrated as a single processor 154, the processor 154 may be implemented as multiple processors in the client 150. Regardless of the type and number, the processor 154 executes instructions and manipulates data to perform the operations of the client 150, including operations to receive and process information from the server 102 or other suitable data source, access data within memory 158, execute the client application 156, as well as perform other operations associated with the client 150.

The client application 156 of the client 150 may retrieve application-related information from a corresponding server 102, or the client application 156 may access a local cached set of client-application-related information (not illustrated) stored on the client 150. In some implementations, the client application 156 can be a Web browser. In some implementations, the client-application 156 can use parameters, metadata, and other information received at launch to access a particular set of data from the server 102. Once a particular client application 156 is launched, a user may interactively process a task, event, or other information associated with the server 102. Further, although illustrated as a single client application 156, the client application 156 may be implemented as multiple client applications in the client 150.

Similarly, memory 158 of the client 150 may include any memory or database module and may take the form of volatile or non-volatile memory including, without limitation, magnetic media, optical media, random access memory (RAM), read-only memory (ROM), removable media, or any other suitable local or remote memory component. For example, memory 158 may store a client application 156, backup data, parameters, cookies, variables, algorithms, instruction, rules, or reference thereto. As illustrated, memory 158 can include any suitable components to interpret and decode messages received at the client 150. Further, although illustrated as a single memory 158, the memory 158 may be implemented as multiple memories in the client 150.

The interface 160 of the client 150 may be similar to the interface 104 of the server 102, in that it may comprise logic encoded in software and/or hardware in a suitable combination and operable to communicate with the network 120. More specifically, interface 160 may comprise software supporting at least one communication protocol such that the network 120 or hardware is operable to communicate physical signals to and from the client 150. Further, although illustrated as a single interface 160, the interface 160 may be implemented as multiple interfaces in the client 150.

While FIG. 1 is described as containing or being associated with a plurality of components, not all components illustrated within the illustrated implementation of FIG. 1 may be utilized in each implementation of the present disclosure. Additionally, at least one component described herein may be located external to example environment 100, while in other implementations, certain components may be included within or as a portion of at least one described component, as well as other components not described. Further, certain components illustrated in FIG. 1 may be combined with other components, as well as used for alternative or additional purposes, in addition to those purposes described herein.

Figure 2A:
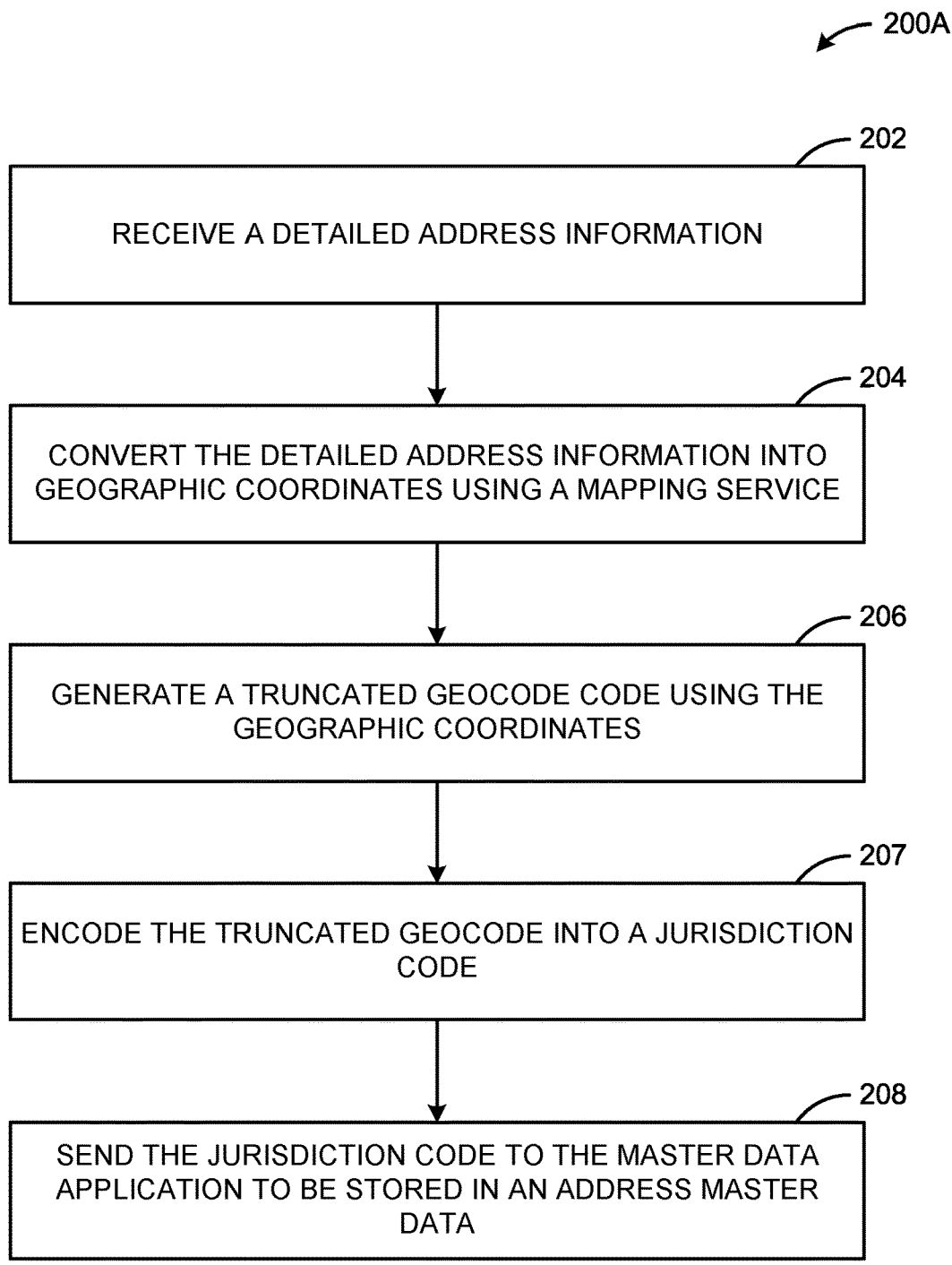
FIG. 2A is a flowchart illustrating an example method for generating a jurisdiction code for a master data address.

FIG. 2A/2B is a flowchart illustrating an example method performed by a service for determining a Jurisdiction code. In some implementations, the method of FIG. 2A/2B is performed, at least partially, by Jurisdiction Code Determining service 134. For clarity of presentation, the description that follows generally describes method 200a/200b in the context of FIG. 1. However, it will be understood that method 200a/200b may be performed, for example, by any other suitable system, environment, software, and hardware, or a combination of systems, environments, software, and hardware as appropriate.

Referring now to FIG. 2A method 200a begins at 202. At 202, address data associated with an address instance is received by the jurisdiction code determining service from the master data application. In some implementations, the address instance may be created upon receipt of address data. From 202, method 200a proceeds to 204. At 204, the received address information is converted into geographic coordinates using a map service. In some instances, the address information includes a street name and a door number and area information such as county, city and state name. From 204, method 200a proceeds to 206. At 206, a truncated geocode is generated using the geographic coordinates. From 206, the method 200a proceeds to 207. At 207, the truncated geocode is encoded into a jurisdiction code and at 208, the jurisdiction code is sent to the Master data application to be stored in the jurisdiction code field of address master data.

Figure 2B:
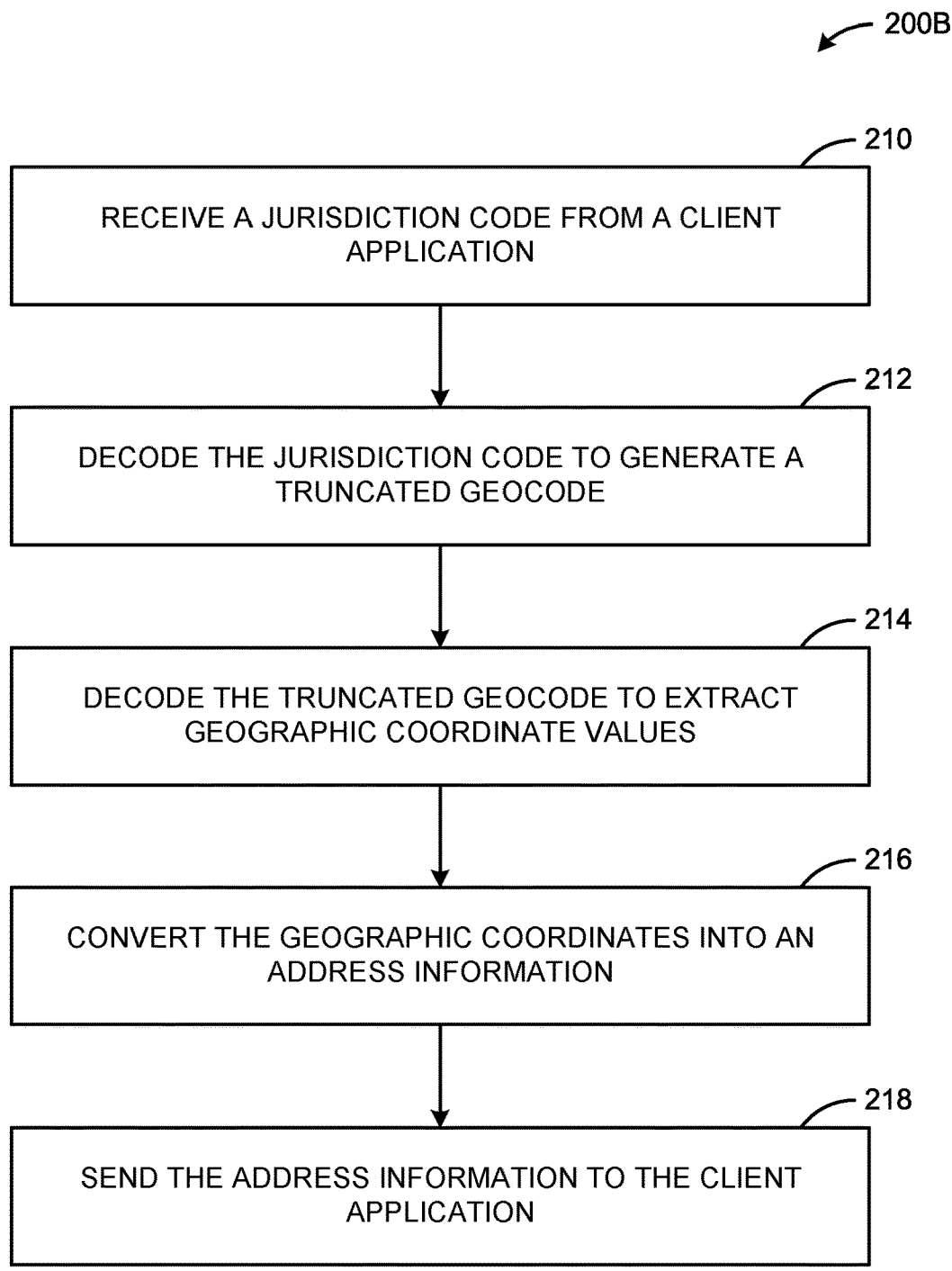
FIG. 2B is a flowchart illustrating an example method for determining address information from a jurisdiction code.

Referring now to FIG. 2B method 200b begins at 210. At 210, a jurisdiction code is received from a client application. The received Jurisdiction code comprises a geocode representing an address information. From 210, method 200b proceeds to 212. At 212, the jurisdiction code is decoded to generate a truncated geocode. From 212, the method 200b proceeds to 214. At 214, the truncated geocode is decoded to extract geographic coordinate values. From 214, the method 200b proceeds to 216. At 216, the geographic coordinate values are converted into address information and sent to the client application at 218.

Figure 3:
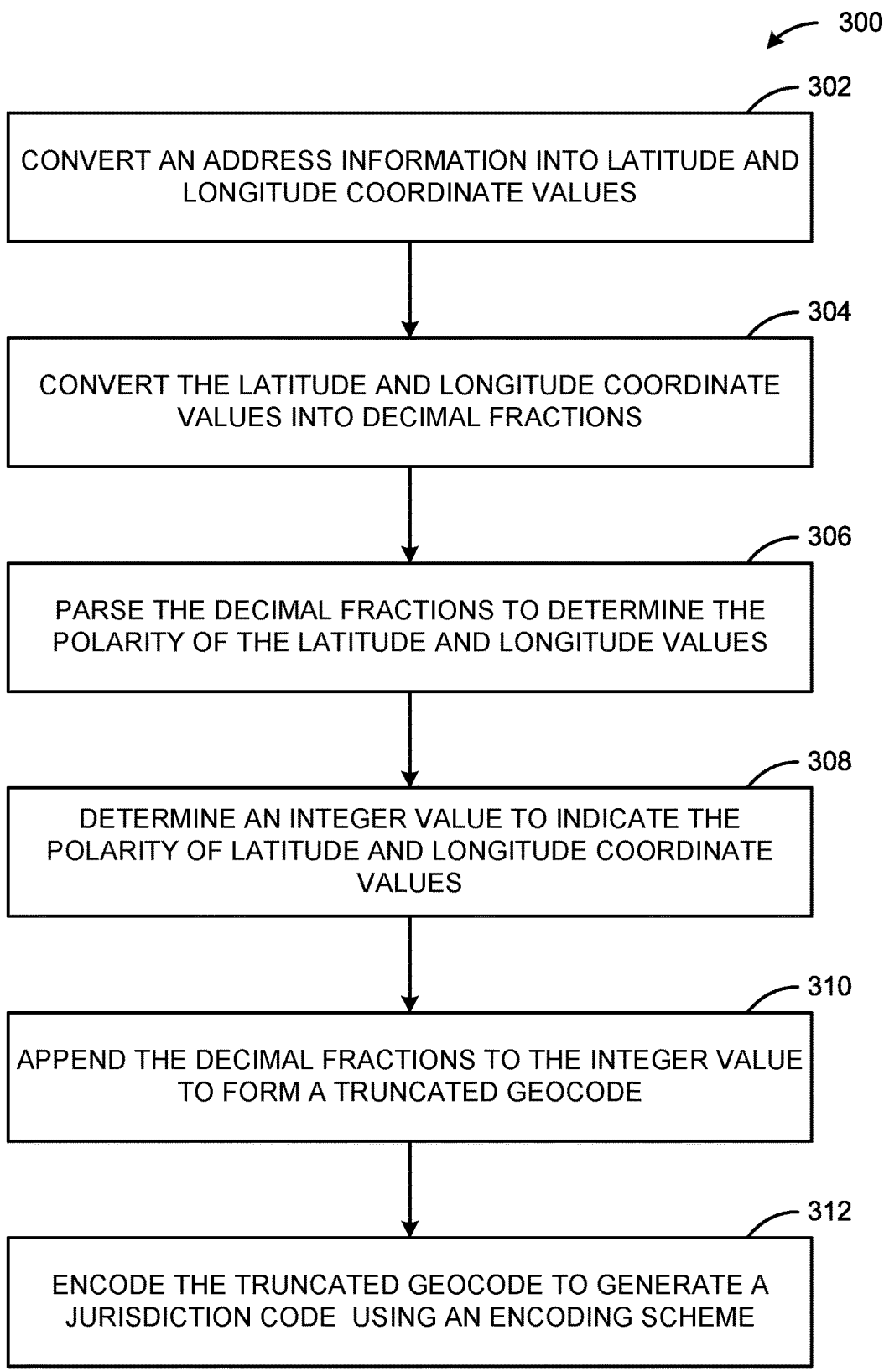
FIG. 3 is a flowchart illustrating an example method for generating a jurisdiction code using an encoding scheme.

FIG. 3 is a flowchart illustrating an example method for generating a geocode using an encoding scheme. In some implementations, the method 300 of FIG. 3 is performed, at least partially, by a Jurisdiction Code Determining Service. For clarity of presentation, the description that follows generally describes method 300 in the context of FIG. 1. However, it will be understood that method 300 may be performed, for example, by any other suitable system, environment, software, and hardware, or a combination of systems, environments, software, and hardware as appropriate.

Referring now to FIG. 3, method 300 illustrates a method of generating a geocode using the geographic coordinates of the address information received at 202. The method 300 begins at 302. At 302, a received address information is converted into latitude and longitude coordinate values measured in decimal degrees. At 304, the latitude and longitude coordinate values are converted into decimal fractions. From 304, the method proceeds to 306. At 306, the decimal fractions are parsed to determine the polarity of the latitude and longitude values. At 308, an integer value is determined to indicate the polarity of latitude and longitude coordinate values. From 308, the method proceeds to 310. At 310, the decimal fractions are appended to the integer value to form a truncated geocode. From 310, the method proceeds to 312. At 312, the truncated geocode is encoded into a jurisdiction code using an encoding scheme.

In an example scenario, a Sourcing and Procurement system typically computes the sales or use tax for each line of a purchase order or an invoice. For this to happen, however, the system needs to know where taxes are being charged. This means that a ship-to tax jurisdiction code must be maintained. This ship-to tax jurisdiction code can correspond to the plant, cost center, asset master, internal order, or project. If no jurisdiction code is maintained on the asset, order, or project, then the jurisdiction code of the responsible cost center maintained on the asset, order, or project will be used for the purchase order or invoice verification document by default during document creation. This jurisdiction code then is used as the ship-to tax destination. In addition to the ship-to destination, the ship-from jurisdiction also influences taxability. A jurisdiction code can be maintained within the supplier's master record. This jurisdiction code is used as the ship-from tax destination.

The Sourcing and Procurement system uses country and tax codes to read tax condition records. For example, indicators on the customer and material master records influence taxability. These indicators are used in condition records to specify the tax code in transactions. The customer and material taxability indicators are criteria in determining tax codes in a sales transaction. As an example, raw materials used for manufacturing will typically be exempt while finished goods are typically taxable.

The system uses an external tax procedure (e.g. 0TXUSX) for the US which calls External Sales & Use Tax SOAP interfaces. Once the SOAP interface is called, a SOAP message with header and item data is populated with the information needed by the partner's tax solution in order to calculate the taxes. This information is then passed to partner's iFlow and then its tax solution. This solution in turn passes the tax data back to the iFlow and then back to the SOAP interface. This data transfer occurs during master data address maintenance to retrieve the appropriate tax jurisdiction codes. It also occurs during order and invoice processing out of finance, materials management, and sales and distribution, when tax rates and tax amounts are retrieved. The tax interface system also updates third-party tax files with the appropriate tax information for legal reporting purposes.

The United States consists of more than 55,000 jurisdictions. A jurisdiction is the taxation authority that imposes the tax. Each jurisdiction is identified by a tax jurisdiction code. This code provides the location for the transaction to be taxed. The tax jurisdiction code is a key, which together with the tax code and other parameters, determines the tax amount and the way in which payment of the entire tax amount is divided between different tax authorities.

In an example scenario, during master data address maintenance, the Sourcing and Procurement solution calls the Jurisdiction code determining service to determine the appropriate jurisdiction code for a master data address instance. The system provides the detailed address information including a street name and door number to the Jurisdiction code determining service. The jurisdiction code determining service, calculates a geocode using the detailed address information and sends the geocode as a jurisdiction code to the Sourcing and Procurement solution which stores the geocode in the jurisdiction code field, of the address master data, which has a fixed field limit of 15 characters.

In another example scenario, the Sourcing and Procurement system may use a jurisdiction code structure defined by a third-party tax service provider. The Jurisdiction code structure is a freely definable field with up to four levels such as State, County, City and district. For example, a jurisdiction code using the TAXUSJ structure has nine characters with the first two denoting the state, the next three denoting the county or parish within the state and the last four denoting the city.

e.g., Jurisdiction of the state of Pennsylvania—PA0000000
  Jurisdiction of the county of Allegheny—PA0010000
  Jurisdiction of the city of Pittsburgh—PA0010100

The Sourcing and Procurement system uses the Jurisdiction Code Structure to maintain the tax rates provided by the third-party tax service provider.

Figure 4:
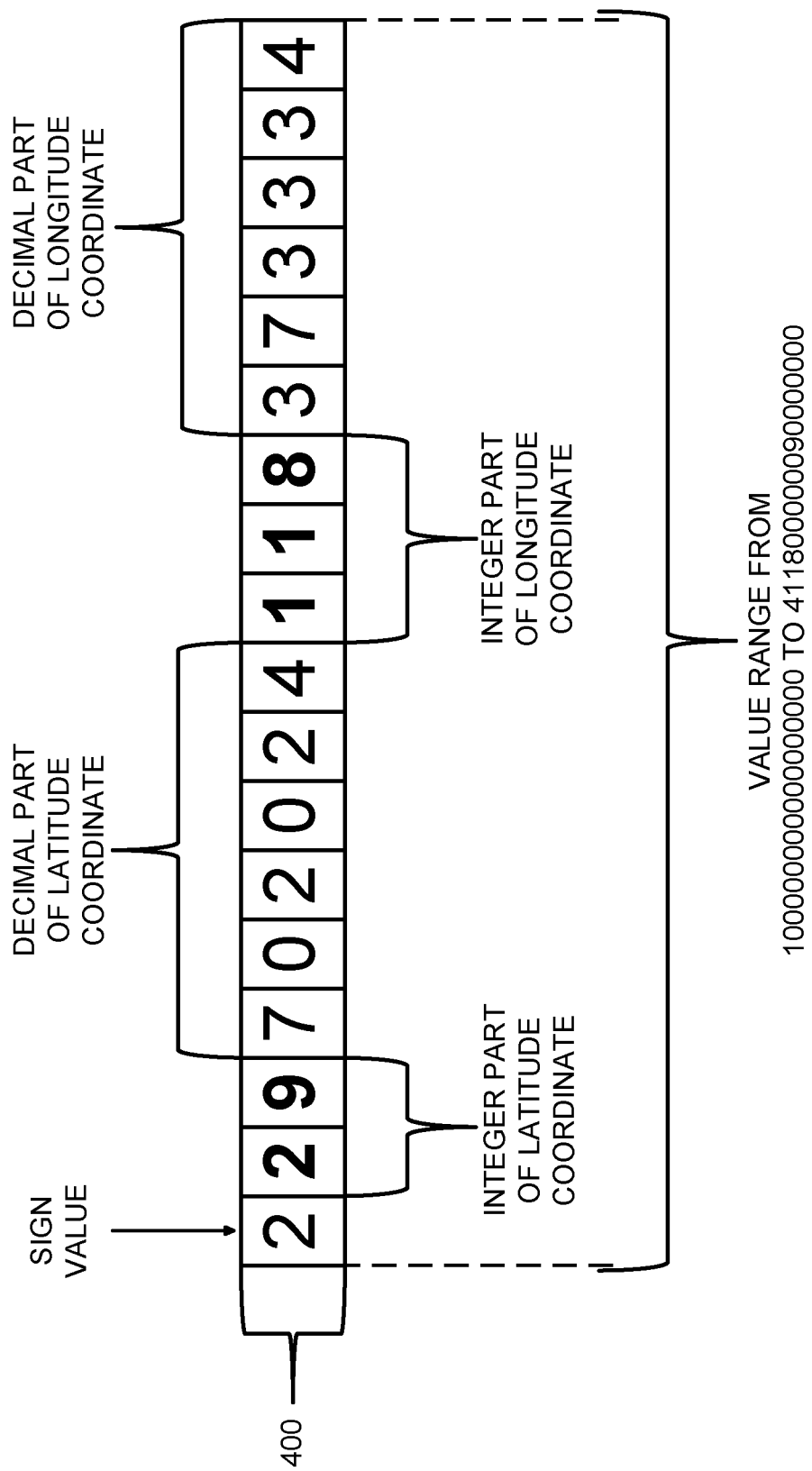
FIG. 4 is an illustration of a format of a truncated geocode used for generating a jurisdiction code.

Referring to FIG. 4, the Jurisdiction code determining service calculates the geocode using an encoding scheme. In an example, the detailed address information stored in the address master data is: 555 Raleigh St, Houston, TX 77021, United States. When an address instance is saved or selected, the detailed address information is sent to the jurisdiction code determining service for determining a Jurisdiction code. The Jurisdiction code determining service uses a Map service to translate the detailed address information into geographic coordinates. In the given example, the geographic coordinates for the given address is 29°42'07.3"N 118°22'24.0"W expressed in decimal degrees. This is then converted into a decimal fraction that equates to +29.702024, −118.373334.

The encoding scheme determines the polarity of the latitude and longitude values and assigns an integer value to represent the polarity of the latitude and longitude coordinate values. For example, if the integer value is 1 it means that both latitude and longitude are positive. If the integer value is 2, it means latitude is positive and longitude is negative. If the integer value is 3, then it means both latitude and longitude are negative. If the integer value is 4, then it means that latitude is negative, and longitude is positive.

In the given example, the latitude value has positive polarity and longitude has negative polarity. So, the integer value used to represent this polarity is 2. Next the method appends the decimal fraction of the latitude and longitude value without the decimal point to the integer value 2.

The resulting string is a truncated geocode:

| 2 | 2 | 9 | 7 | 0 | 2 | 0 | 2 | 4 | 1 | 1 | 8 | 3 | 7 | 3 | 3 | 3 | 4 |
|---|---|---|---|---|---|---|---|---|---|---|---|---|---|---|---|---|---|

The method then uses an encoding scheme such as Base-36 encoding scheme which encodes the above 18-character length truncated geocode into a 12-character length jurisdiction code having a value range from 000000000000 to 3Q0QI4I22VB4. In the example shown in FIG. 4, the 12-character length jurisdiction code for the truncated geocode "400" is 1QTQKL3XKG68. This 12-character length information is then stored as a Jurisdiction code in the jurisdiction code field of Address Master data. In some embodiments, the encoding scheme may have fixed formats for the truncated geocode. For example, a length of three characters may be assigned for longitude before the decimal part and two characters for latitude before the decimal part. The field length for the fraction part of the coordinate values may be fixed to at least 6 characters.

When an external tax solution requests for information needed for tax calculation, the jurisdiction code relating to a relevant address instance is retrieved from the address master data and sent to the tax solution. The tax solution may use a mapping service for decoding the jurisdiction information into an address information. Alternatively, the tax solution may call the jurisdiction code determining service to decode the jurisdiction code into a corresponding address information which the tax solution can use for further processing.

A Generalized Computer Environment

Figure 5:
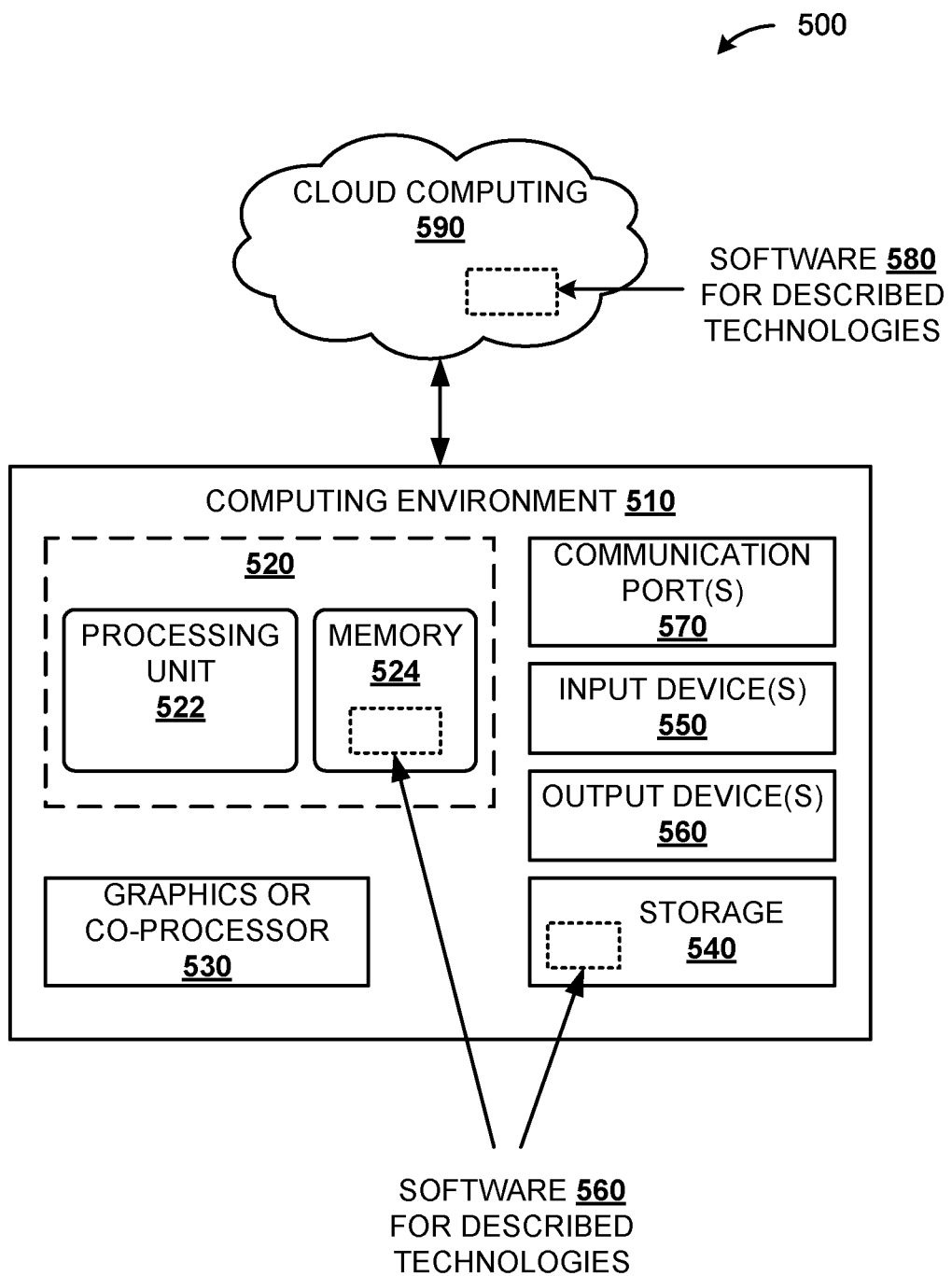
FIG. 5 is a diagram schematically depicting a computing environment suitable for implementation of disclosed technologies.

FIG. 5 illustrates a generalized example of a suitable computing system 500 in which described examples, techniques, and technologies, including construction, deployment, operation, query processing, and maintenance of a composite graph data structure or dynamic rooted trees according to disclosed technologies can be implemented. The computing system 500 is not intended to suggest any limitation as to scope of use or functionality of the present disclosure, as the innovations can be implemented in diverse general-purpose or special-purpose computing systems.

With reference to FIG. 5, computing environment 510 includes one or more processing units 522 and memory 524. In FIG. 5, this basic configuration 520 is included within a dashed line. Processing unit 522 executes computer-executable instructions, such as for implementing any of the methods or objects described herein for performing queries on a composite graph data structure representing a dynamic system, or various other architectures, components, handlers, managers, modules, or services described herein. Processing unit 522 can be a general-purpose central processing unit (CPU), a processor in an application-specific integrated circuit (ASIC), or any other type of processor. In a multi-processing system, multiple processing units execute computer-executable instructions to increase processing power. Computing environment 510 can also include a graphics processing unit or co-processing unit 530. Tangible memory 524 can be volatile memory (e.g., registers, cache, or RAM), non-volatile memory (e.g., ROM, EEPROM, or flash memory), or some combination thereof, accessible by processing units 522, 530. The memory 524 stores software 580 implementing one or more innovations described herein, in the form of computer-executable instructions suitable for execution by the processing unit(s) 522, 530. The memory 524 can also store a composite graph data structure, including nodes, edges, and their respective attributes; a table or other data structure indicating states of a modeled system, configuration data, UI displays, browser code, data structures including data tables, working tables, change logs, output structures, input fields, output fields, data values, indices, or flags, as well as other operational data.

A computing system 510 can have additional features, such as one or more of storage 540, input devices 550, output devices 560, or communication ports 570. An interconnection mechanism (not shown) such as a bus, controller, or network interconnects the components of the computing environment 510. Typically, operating system software (not shown) provides an operating environment for other software executing in the computing environment 510, and coordinates activities of the components of the computing environment 510.

The tangible storage 540 can be removable or non-removable, and includes magnetic disks, magnetic tapes or cassettes, CD-ROMs, DVDs, or any other medium which can be used to store information in a non-transitory way and which can be accessed within the computing environment 510. The storage 540 stores instructions of the software 580 (including instructions and/or data) implementing one or more innovations described herein.

The input device(s) 550 can be a mechanical, touch-sensing, or proximity-sensing input device such as a keyboard, mouse, pen, touchscreen, trackball, a voice input device, a scanning device, or another device that provides input to the computing environment 510. The output device (s) 560 can be a display, printer, speaker, optical disk writer, or another device that provides output from the computing environment 510.

The communication port(s) 570 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 500 can also include a computing cloud 590 in which instructions implementing all or a portion of the disclosed technology are executed. Any combination of memory 524, storage 540, and computing cloud 590 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 6:
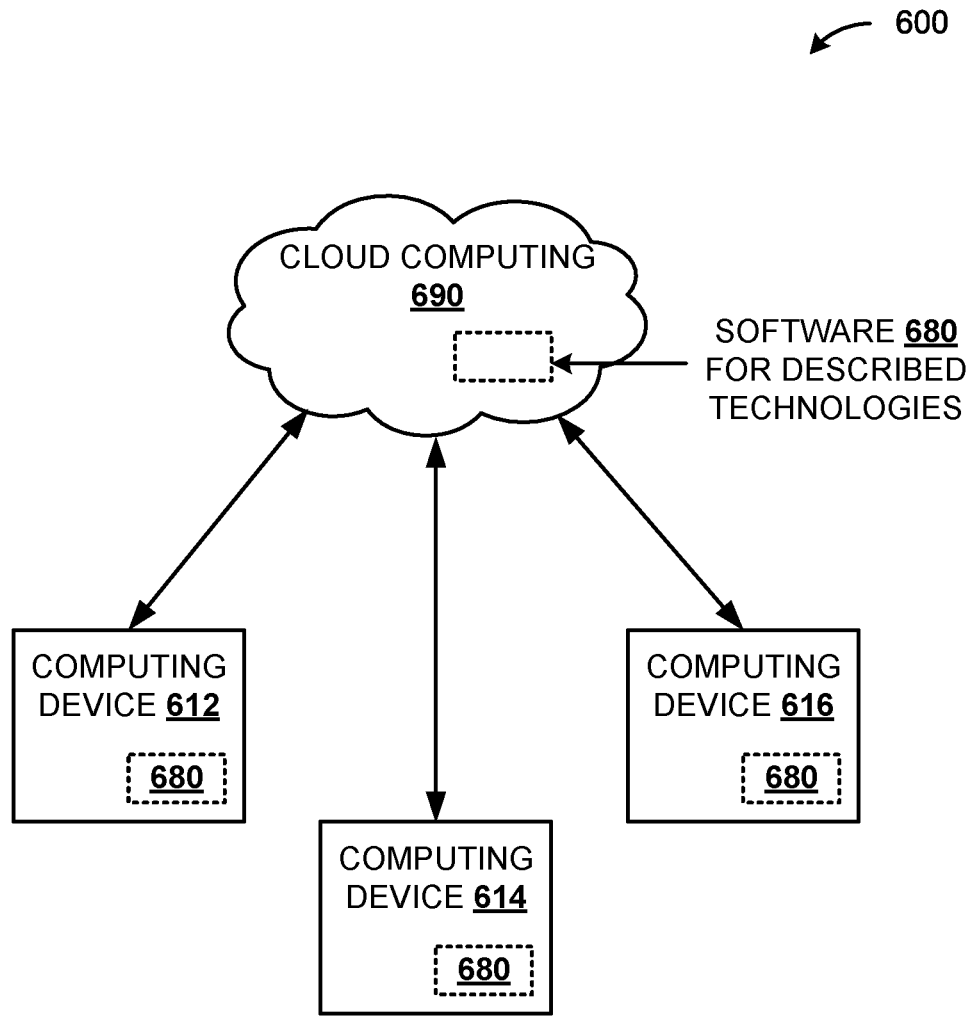
FIG. 6 is a diagram schematically depicting computing devices operating in conjunction with a computing cloud for implementation of disclosed technologies.

FIG. 6 depicts an example cloud computing environment 600 in which the described technologies can be implemented. The cloud computing environment 600 comprises a computing cloud 690 containing resources and providing services. The computing cloud 690 can comprise various types of cloud computing resources, such as computer servers, data storage repositories, networking resources, and so forth. The computing cloud 690 can be centrally located (e.g., provided by a data center of a business or organization) or distributed (e.g., provided by various computing resources located at different locations, such as different data centers and/or located in different cities or countries). It is to be understood that the example cloud computing environment 600 is one example environment in which the described technologies can be implemented, and other environments may be used in addition or alternatively to the example cloud computing environment. For example, the described technologies may be implemented on peer-to-peer networks and/or in coordination with a blockchain storage mechanism.

The computing cloud 690 can be operatively connected to various types of computing devices (e.g., client computing devices), such as computing devices 612, 614, and 616, and can provide a range of computing services thereto. One or more of computing devices 612, 614, and 616 can be computers (e.g., servers, virtual machines, embedded systems, desktop, or laptop computers), mobile devices (e.g., tablet computers, smartphones, or wearable appliances), or other types of computing devices. Communication links between computing cloud 690 and computing devices 612, 614, and 616 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 612, 614, and 616 can also be connected to each other.

Computing devices 612, 614, and 616 can utilize the computing cloud 690 to obtain computing services and perform computing operations (e.g., data processing, data storage, and the like). Particularly, software 680 for performing the described innovative technologies can be resident or executed in the computing cloud 690, in computing devices 612, 614, and 616, or in a distributed combination of cloud and computing devices.

GENERAL CONSIDERATIONS

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 5, computer-readable storage media include memory 524, and storage 540. The term computer-readable storage media does not include signals and carrier waves. In addition, the term computer-readable storage media does not include communication ports (e.g., 570) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, Basic, C, C++, C#, Curl, Dart, Fortran, Go, Java, JavaScript, Julia, Lisp, Matlab, Octave, Pascal, Perl, PHP, Python, R, Ruby, SAS, SPSS, Visual Basic, WebAssembly, Whitespace, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A computer-implemented method performed by a computer system having a memory and at least one hardware processor, the computer-implemented method comprising:
    receiving, by a jurisdiction code determining service, an address information associated with a user from a master data application;
    converting the address information into geographic coordinates using a mapping service, the geographic coordinates comprising a latitude coordinate value and a longitude coordinate value;
    generating a truncated geocode using the geographic coordinates, the truncated geocode including:
        a first portion comprising a first integer value to indicate respective polarities of the latitude coordinate value and the longitude coordinate value,
        a second portion comprising a latitude coordinate integer portion of the latitude coordinate value,
        a third portion comprising a latitude coordinate decimal portion of the latitude coordinate value,
        a fourth portion comprising a longitude coordinate integer portion of the longitude coordinate value,
        a fifth portion comprising a longitude coordinate decimal portion of the longitude coordinate value;
    encoding the truncated geocode into a jurisdiction code using an encoding scheme; and
    sending the jurisdiction code to the master data application to be stored in an address master data.

2. The method of claim 1, wherein an address information comprises receiving at least a street name.

3. The method of claim 1, wherein the jurisdiction code is stored in a jurisdiction code field of the address master data.

4. The method of claim 3, wherein the jurisdiction code field has a fixed character length.

5. The method of claim 1, wherein the generated jurisdiction code is 12 characters long.

6. The method of claim 1, wherein generating a truncated geocode using the geographic coordinates comprises:
    converting the geographic coordinates into latitude and longitude coordinate values;
    converting the latitude and longitude coordinate values into decimal fractions;
    parsing the decimal fractions to determine the polarity of the latitude and longitude coordinate values;
    determining an integer value to indicate the polarity of latitude and longitude coordinate values; and
    appending the decimal fractions to the integer value to form the truncated geocode.

7. The method of claim 6, wherein converting the geographic coordinates into latitude and longitude coordinate values comprises converting the geographic coordinates into latitude and longitude coordinate values measured in decimal degrees.

8. The method of claim 6, wherein converting the latitude and longitude coordinate values into decimal fractions comprises determining the decimal fractions for up to a length of at least six digits to the right of decimal point.

9. The method of claim 1, wherein encoding the truncated geocode into a jurisdiction code using an encoding scheme comprises using a Base36 encoding scheme.

10. A computer-implemented method performed by a computer system having a memory and at least one hardware processor, the computer-implemented method comprising:
- receiving, by a jurisdiction code determining service, an address information associated with a user from a master data application;
- converting the address information into geographic coordinates using a mapping service;
- generating a truncated geocode using the geographic coordinates comprising:
  - converting the geographic coordinates into a latitude coordinate value and a longitude coordinate values;
  - converting the latitude and longitude coordinate values into decimal fractions;
  - parsing the decimal fractions to determine the respective polarities of the latitude and longitude coordinate values;
  - determining an integer value comprising a first portion to indicate the respective polarities of the latitude and longitude coordinate values; and
  - generating a second portion comprising a latitude coordinate integer portion of the latitude coordinate value,
  - generating a third portion comprising a latitude coordinate decimal portion of the latitude coordinate value,
  - generating a fourth portion comprising a longitude coordinate integer portion of the longitude coordinate value,
  - generating a fifth portion comprising a longitude coordinate decimal portion of the longitude coordinate value;
- encoding the truncated geocode into a jurisdiction code using an encoding scheme; and
- sending the jurisdiction code to the master data application to be stored in an address master data.

11. The system of claim 10, wherein the address information comprises at least a street name.

12. The system of claim 10, wherein the decimal fractions have a length of at least six digits to the right of decimal point.

13. The system of claim 10, wherein the jurisdiction code is stored in a jurisdiction code field of the address master data.

14. The system of claim 13, wherein the jurisdiction code field has a fixed character length.

15. The system of claim 10, wherein the generated jurisdiction code is 12 characters long.

16. A system comprising:
- at least one hardware processor of a managed private cloud architecture serving an organization; and
- a non-transitory computer-readable medium of the managed private cloud architecture, the non-transitory computer-readable medium storing executable instructions that, when executed, cause the at least one processor to perform operations comprising:
- receiving, by a jurisdiction code determining service, an address information associated with a user from a master data application;
- converting the address information into geographic coordinates using a mapping service, the geographic coordinates comprising a latitude coordinate value and a longitude coordinate value;
- generating a truncated geocode using the geographic coordinates, the truncated geocode including:
  - a first portion comprising a first integer value to indicate respective polarities of the latitude coordinate value and the longitude coordinate value,
  - a second portion comprising a latitude coordinate integer portion of the latitude coordinate value,
  - a third portion comprising a latitude coordinate decimal portion of the latitude coordinate value,
  - a fourth portion comprising a longitude coordinate integer portion of the longitude coordinate value,
  - a fifth portion comprising a longitude coordinate decimal portion of the longitude coordinate value;
- encoding the truncated geocode into a jurisdiction code using an encoding scheme; and
- sending the jurisdiction code to the master data application to be stored in an address master data.

* * * * *